United States Patent
Sines et al.

(10) Patent No.: US 6,513,697 B1
(45) Date of Patent: Feb. 4, 2003

(54) TIP HEATER CARTRIDGE AND SOLDERING IRON FOR USE THEREWITH

(75) Inventors: Gary Silas Sines, Woodbine, MD (US); Paul Alan Dunham, Milton Keynes (GB); Jeffrey Alan Snell, Abingdon, MD (US); John Franklin Wood, New Windsor, MD (US); William Jordan Siegel, Bethesda, MD (US)

(73) Assignee: Pace, Incorporated, Annapolis Junction, MD (US)

( * ) Notice: Subject to any disclaimer, the term of this patent is extended or adjusted under 35 U.S.C. 154(b) by 0 days.

(21) Appl. No.: 09/972,194

(22) Filed: Oct. 9, 2001

(51) Int. Cl.[7] .............................. B23K 3/02; B23K 3/03
(52) U.S. Cl. .......................................... 228/51; 228/55
(58) Field of Search .............................. 228/51, 52, 53, 228/54, 55; 219/229

(56) References Cited

U.S. PATENT DOCUMENTS

| | | | | |
|---|---|---|---|---|
| 5,007,574 A | * | 4/1991 | Carlomagno et al. | 219/236 |
| 5,143,272 A | * | 9/1992 | Carlomagno | 228/20 |
| 5,151,574 A | * | 9/1992 | Urban | 219/241 |
| 5,329,085 A | * | 7/1994 | Cowell et al. | 219/229 |
| 5,683,603 A | * | 11/1997 | Fortune | 219/229 |
| 5,837,973 A | * | 11/1998 | Tamura | 219/229 |

FOREIGN PATENT DOCUMENTS

EP          0386948 A1 *   9/1990

* cited by examiner

Primary Examiner—Tom Dunn
Assistant Examiner—Kiley Stoner
(74) Attorney, Agent, or Firm—Nixon Peabody LLP; David S. Safran

(57) ABSTRACT

A tip heater cartridge and a soldering iron with handpiece for use therewith in which, according to a preferred embodiment, a precision molded plastic sleeve is provided on the tip heater cartridge body. The sleeve is provided with an axially extending, radially projecting key which assures accurate tip-to-handpiece orientation and also produces a rigid mechanical interlock between the tip heater cartridge and the handpiece to ensure that there is no axial rotational or lateral movement or load transmitted from the tip of the tip heater cartridge to the electrical connector. In a particularly preferred arrangement, the end of the key acts with the handle keyway to prevent over insertion of the tip heater cartridge into the handpiece, which could damage the electrical connector assembly, and an O-ring on the electrical connector assembly acts to produces a seal relative to the body of the cartridge that prevents solder fumes from flowing into the connector assembly. The O-ring also serves to assist in retaining the cartridge within the handle and provides additional lateral support to the cartridge.

18 Claims, 4 Drawing Sheets

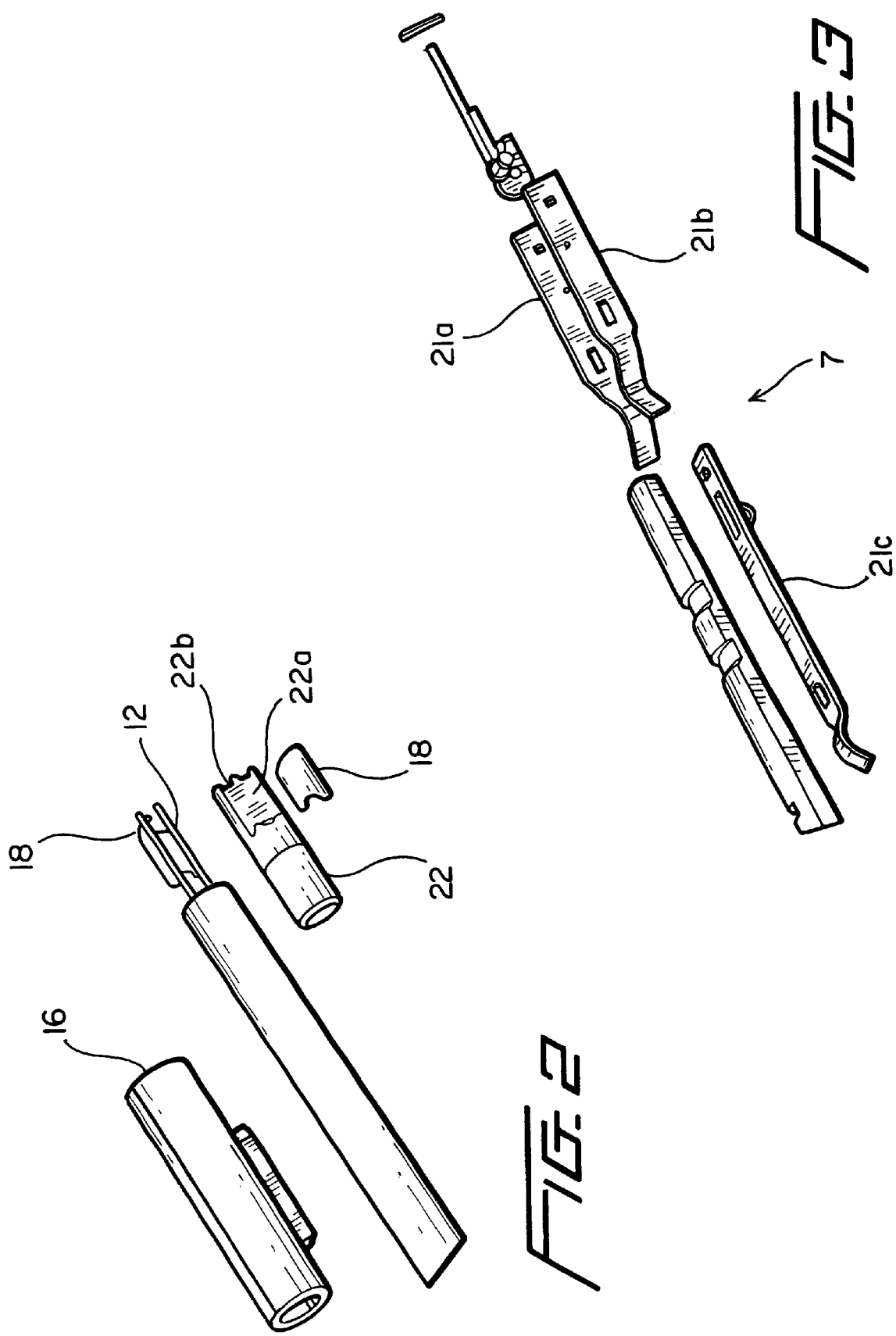

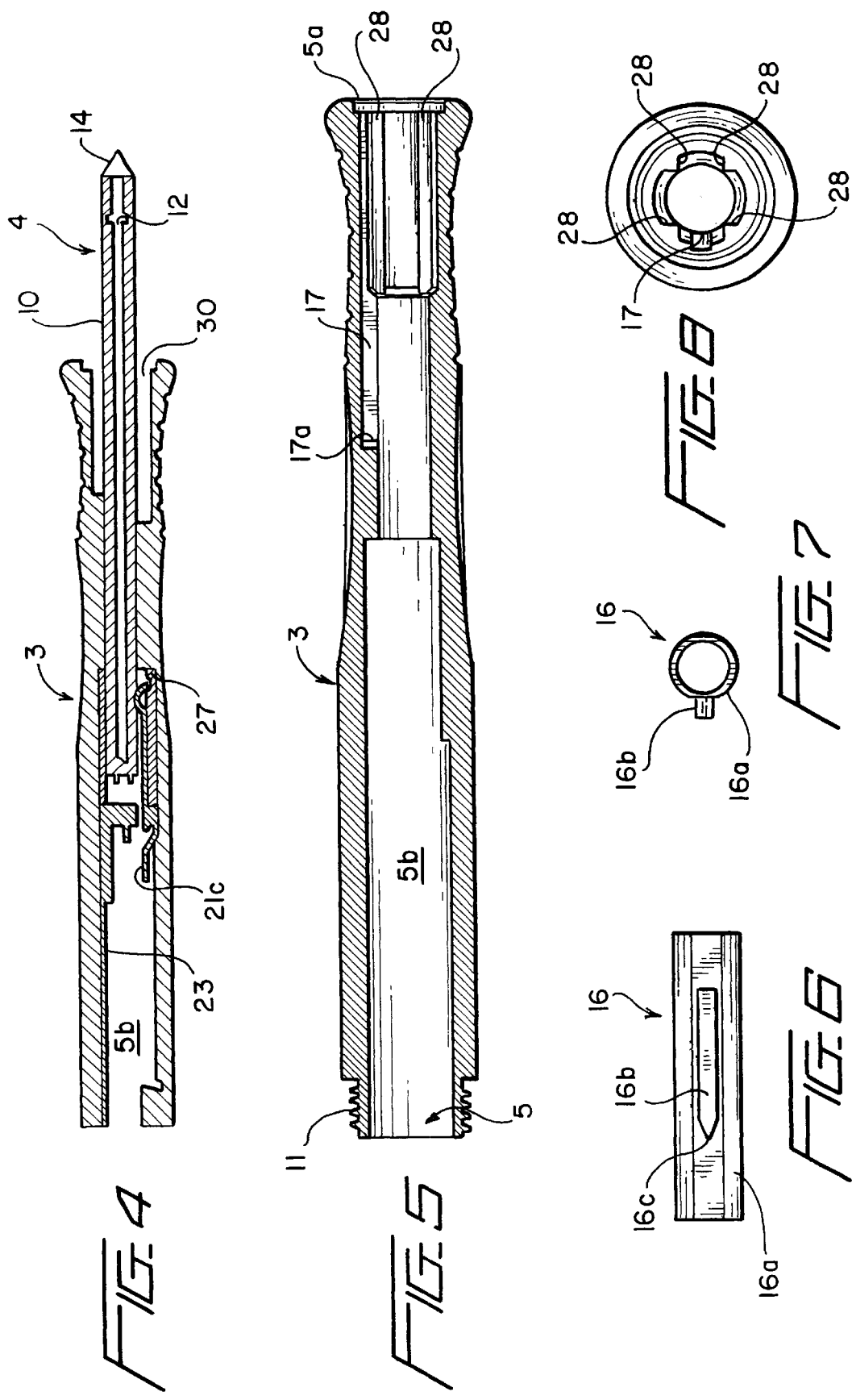

TIP HEATER CARTRIDGE AND SOLDERING IRON FOR USE THEREWITH

BACKGROUND OF THE INVENTION

1. Field of the Invention

The present invention relates to soldering irons of the type having a replaceable tip heater cartridge in which the soldering tip is formed as part of the heater cartridge and can be connected to the soldering tool handpiece and removed therefrom by a simple plug-in and pull-out operation.

2. Description of Related Art

Soldering irons which use a replaceable tip heater cartridge in which the soldering tip is formed as part of the heater cartridge and where the cartridge can be connected to the soldering tool handpiece and removed therefrom by a simple plug-in and pull-out operation are known, one example being that of U.S. Pat. No. 4,839,501. Such known soldering irons possess several shortcomings. Firstly, loads applied to the soldering tip are transferred to the electrical connectors of the handpiece so that they can become damaged with extended use, and these connectors are not easily replaced. Furthermore, the coaxial connectors used for electrical and mechanical connection of the cartridge to the handpiece prevent use of cartridges with other than rotational symmetric, i.e., conical, soldering tips due to the fact that no means exists to provide accurate tip-to-handle orientation or to maintain whatever tip orientation is initially set, particularly if the handle is one half of a tweezer arrangement in which maintenance of the tip orientation is critical to its function.

SUMMARY OF THE INVENTION

In view of the foregoing, it is an object of the present invention to provide a replaceable tip heater cartridge, of the type in which the soldering tip is formed as part of the heater cartridge and the cartridge can be connected to the soldering tool handpiece and removed therefrom by a simple plug-in and pull-out operation, which is constructed in a manner that loads applied to the soldering tip will not be transferred to the electrical connectors of the handpiece so that they will not become damaged even with extended use or abusive use.

It is another object of the present invention to provide a replaceable tip heater cartridge, of the type in which the soldering tip is formed as part of the heater cartridge and the cartridge can be connected to the soldering tool handpiece and removed therefrom by a simple plug-in and pull-out operation, which is constructed in a manner that an accurate tip-to-handpiece orientation is easily obtained and maintained by the provision of a rigid mechanical interlock between the tip heater cartridge and the handpiece which ensures that there is no rotational or lateral movement between them.

Yet another object of the present invention is to provide a handpiece with an electrical connector assembly that can easily be removed for replacement or maintenance.

Because fumes are produced during the soldering process that are harmful to the electrical connections, it is an additional object to prevent such fumes from flowing into the connector assembly.

These and other objects and advantages are achieved in accordance with the present invention which, in accordance with a preferred embodiment, has a precision molded plastic sleeve on the cartridge body. The sleeve is provided with an axially extending, radially projecting key which assures accurate tip-to-handpiece orientation and also produces a rigid mechanical interlock between the tip heater cartridge and the handpiece to ensure that there is no axial, rotational or lateral movement or load transmitted from the tip of the tip heater cartridge to the electrical connector. In a particularly preferred arrangement, the end of the key acts with the handle keyway to prevent over insertion of the tip heater cartridge into the handpiece, which could damage the electrical connector assembly, and an O-ring on the electrical connector assembly acts to produces a seal relative to the body of the cartridge that prevents solder fumes from flowing into the connector assembly. The O-ring also serves to assist in retaining the cartridge within the handle and provides additional lateral support to the cartridge.

These and other features of the invention are described in further detail below with reference to the accompanying drawings.

BRIEF DESCRIPTION OF THE DRAWINGS

FIG. 2 is an enlarged view of detail A of FIG. 1;

FIG. 3 is an enlarged view of detail B of FIG. 1;

FIG. 4 is a cross-sectional view of soldering iron having a handpiece and tip heater cartridge of FIG. 1 in assembled form.

FIG. 5 is a cross-sectional view of the handpiece by itself;

FIG. 6 is a side elevation of the tip heater cartridge sleeve;

FIG. 7 is an inner end view of the sleeve shown in FIG. 7;

FIG. 8 is a front end view of the handpiece of FIG. 5; and

DETAILED DESCRIPTION OF THE INVENTION

Figure 1:
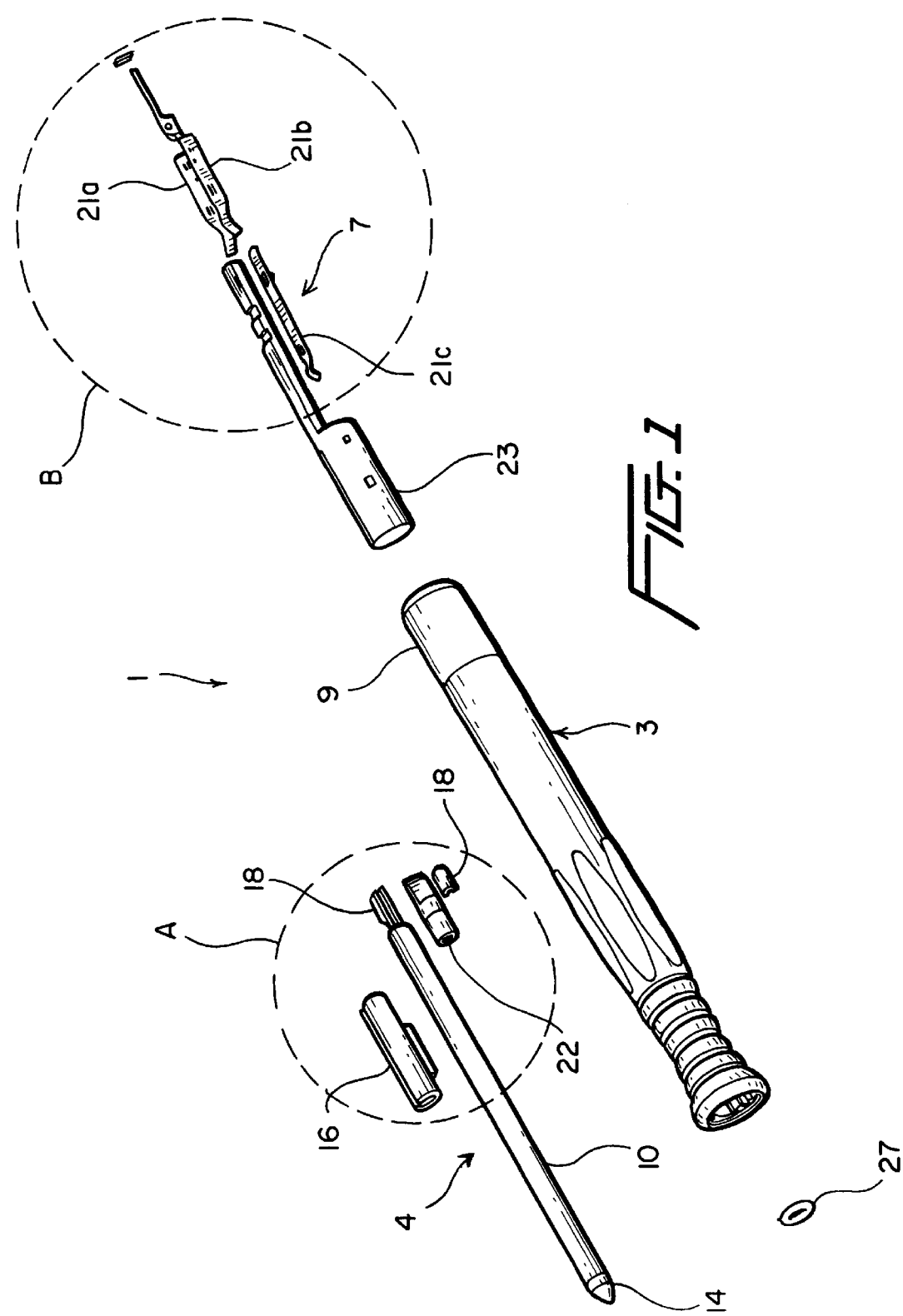
FIG. 1 is an exploded perspective view of a soldering iron having a handpiece and tip heater cartridge in accordance with the present invention.
Figure 9:
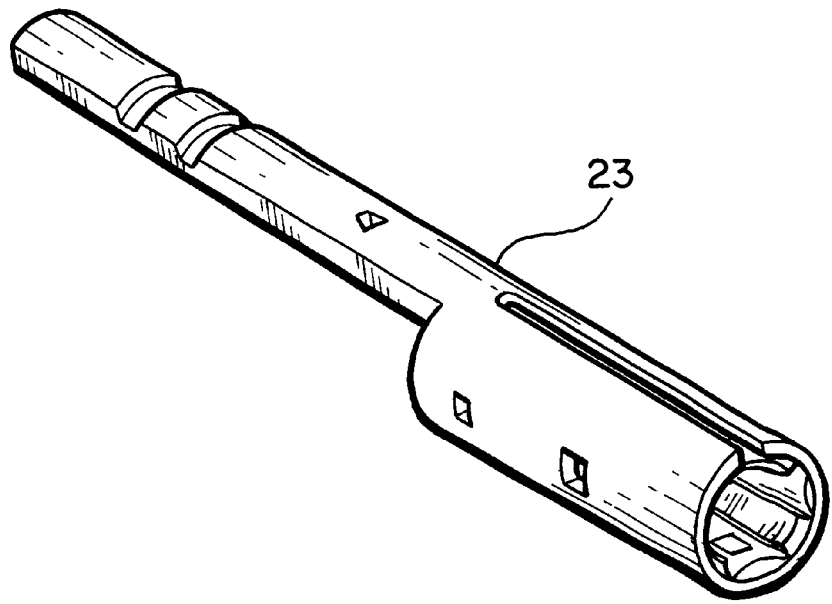
FIGS. 9 & 10 are outer and inner end perspective views, respectively, of a receptacle body of the handpiece connector assembly.
Figure 10:
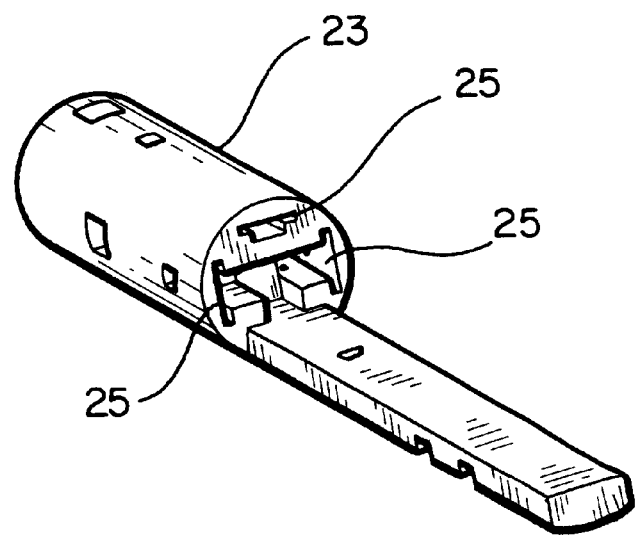

The soldering iron 1 in accordance with the present invention has a handpiece 3 and a tip heater cartridge 4. The handpiece 3 has an elongated hollow body with an inner passage 5 that is open at an outer end 5a of the passage 5 for receiving the tip heater cartridge 4. An electrical connector assembly 7 is mounted in an inner end 5b of the passage 5, being inserted from the opposite direction as the cartridge 4, and then being held in place by an end cap 9 that is screwed onto the threads 11 and through which an electric power cord (not shown) extends. This constructional feature allows the connector assembly 7 to be removed for maintenance or repair.

The tip heater cartridge 4 has an elongated cartridge body 10 within which a heater 12 is mounted. A soldering tip 14 is mounted on a first end of the cartridge body 10. The construction and mounting of the heater 12 and soldering tip 14, by themselves, form no part of this invention and can be of any type and arrangement known in the art; see, e.g., U.S. Pat. Nos. 4,839,501 and 6,054,678.

A significant feature of the invention is that a mechanical orienting piece and a mechanical supporting piece are mounted on the exterior of the cartridge 10 body for orienting and supporting the cartridge 4 relative to the soldering iron handpiece 3 by engagement thereof with inner surface areas of said passage. For this purpose, at least one annular member is provided as the mechanical supporting piece and at one axially extending, radially projecting key member is provided as the mechanical orienting piece. Thus, while the preferred embodiment illustrated here forms the annular member and the key member as unitary parts 16a, 16b, respectively, of a molded plastic sleeve 16 that is mounted onto a lower portion of the cartridge body 10, the can be made as separate parts as well. For example, the key member can be held in an axially running groove formed in the cartridge body 10 with separate annular bands being secured around the body 10 at each end of the key member. Likewise, a sufficiently robust pin member could serve as the key 16b. Similarly, the annular member could be a split ring or series of segments, pins or other sufficiently robust element spaced about the periphery of the cartridge.

A keyway 17 is provided along a portion of said inner passage extending inward from said outer end 5a for receiving the key 16. The cartridge 10 must be in the proper rotational orientation relative to the handpiece 3 for the key 16 to align with the keyway 17, so that the cartridge 10 cannot be inserted into the handpiece 3 if it is not properly oriented. The key member 16 has a tapered end 16c facing toward the end of the cartridge body 10 having the electrical connectors 18, and serves for guiding insertion of the key 16 into the keyway 17 of the soldering iron handpiece 3. Furthermore, the keyway 17 has a stop surface 17a which is engageable by an inwardly facing, tapered end 16c of the key 16 for limiting insertion of the cartridge 4 into the handpiece 3 without applying mechanical stress to the electrical connectors 18 or the electrical connector assembly 7.

The electrical connector assembly comprises leaf spring connectors 21a, 21b, 21c, which are mounted in a receptacle body 23 which has slots 25 for reception thereof. When the tip heater cartridge 4 is plugged into the handpiece 3, the leaf spring connectors 21a, 21b, slide onto the plate-shaped electrical connectors 18 that are attached to the leads of the cartridge heater 12 to form an electrical connection therewith, and the leaf spring connector 21c slides onto the stainless steel body 10 of the tip heater cartridge 4 to provide a grounding interface connection therewith, as the inner end of the tip heater cartridge 4 is moved into the tubular portion 23a of the receptacle body 23. While a bent tab of one of the plate-shaped electrical connectors 18 is shown attached to an end of one of the leads of the cartridge heater in FIG. 2, it should be appreciated that this connection is formed after the leads are passed through a cartridge end cap 22 which has surfaces 22a, and notches 22b for receiving and supporting the a plate-shaped connectors 18 and their bent tabs.

An O-ring 27 (FIGS. 1 & 4) is mounted at the front end of the receptacle body and is held there against by a formation on an inner surface of the handpiece 3. The O-ring 27 forms a sealed interface with respect to the body 10 of the tip heater cartridge 4 when it is fully inserted. As a result, fumes produced during soldering processes performed with the soldering iron cannot flow into the connector assembly 7 where they could corrode the connectors. Additionally, the O-ring also serves to assist in retaining the cartridge within the handle and provides additional lateral support to the cartridge 4.

With reference to FIGS. 5 & 7, it can be seen there that radially inwardly extending guide formations 28 (which are triangular in the illustrated embodiment but need not be) are provided along a front portion of the handpiece. The guide formations 28 contact the periphery of the annular member 16a of the sleeve 16 for aligning and guiding the sleeve during initial insertion of the cartridge into the handpiece. However, the formations 28 are axially spaced from the annular member 16a of the sleeve 16 and are radially spaced from smaller diameter cartridge body 10 in the fully inserted position of the tip heater cartridge 4 within said passage 5 of the handpiece 4. Thus, as is apparent from FIG. 4, a clearance space 30 exists between the cartridge 4 and the front end of the handpiece 3 which allows this portion to remain relatively cool so that a user can comfortably hold the handpiece in a pencil-type grip in this area. On the other hand, as is apparent from FIG. 8, the outer diameter of this clearance space is less than that at the keyway 17, thus precluding the insertion of the key 16 anywhere other than at the keyway 17.

While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

What is claimed is:

1. A tip heater cartridge for a soldering iron, comprising:
    an elongated cartridge body,
    a heater mounted within the cartridge body;
    a soldering tip mounted on a first end of the cartridge body;
    electrical connectors at an opposite, second end of the cartridge body for plug-in connection with an electrical connector assembly of a soldering iron handpiece in use; and
    a mechanical orienting piece and a mechanical supporting piece mounted on the exterior of the cartridge body for rotationally orienting and axially supporting the cartridge relative to the soldering iron handpiece in use.

2. Tip heater cartridge according to claim 1, wherein at least one annular member is provided as said mechanical supporting piece and wherein at least one radially projecting key member is provided as said mechanical orienting piece.

3. Tip heater cartridge according to claim 2, wherein said at least one annular member and said key member are parts of a sleeve mounted on a lower portion of the cartridge body.

4. Tip heater cartridge according to claim 2, wherein said key member has a tapered end facing toward said second end of the cartridge body for guiding insertion of the key into the soldering iron handpiece in use.

5. A soldering iron having a handpiece and tip heater cartridge,
    wherein the handpiece has:
        an elongated hollow body with an inner passage that is open at an outer end of the passage and which receives said tip heater cartridge; and
        an electrical connector assembly mounted at an inner end of said passage; and
    wherein the tip heater cartridge comprises:
        an elongated cartridge body;
        a heater mounted within the cartridge body;
        a soldering tip mounted on a first end of the cartridge body;
        electrical connectors at an opposite, second end of the cartridge body for plug-in connection with he electrical connector assembly of the soldering iron handpiece; and
        a mechanical orienting piece and a mechanical supporting piece mounted on the exterior of the cartridge body for rotationally orienting and axially supporting the cartridge relative to the soldering iron handpiece by engagement thereof with inner surface areas of said passage.

6. Soldering iron according to claim 5, wherein at least one annular member is provided as said mechanical supporting piece; wherein at least one radially projecting key member is provided as said mechanical orienting piece; and wherein a keyway is provided along a portion of said inner passage extending inward from said outer end, said key being receivable in said keyway.

7. Soldering iron according to claim 6, wherein said at least one annular member and said key member are parts of a molded plastic sleeve mounted on a lower portion of the cartridge body.

8. Soldering iron according to claim 6, wherein said key member has a tapered end facing toward said second end of the cartridge body for guiding insertion of the key into the soldering iron handpiece.

9. Soldering iron according to claim 6, wherein said keyway has a stop surface which is engageable by an inwardly facing end of the key for limiting insertion of said cartridge into said handpiece without applying mechanical stress to the electrical connectors and the electrical connector assembly.

10. Soldering iron according to claim 5, wherein said electrical connector assembly comprises leaf spring connectors for providing an electrical and grounding interface connection with the tip heater cartridge.

11. Soldering iron according to claim 9, wherein an O-ring is provided on a front end portion of said electrical connector assembly, said O-ring sealingly engaging around an outer surface of the cartridge body for preventing a flow of soldering fumes into the connector assembly.

12. Soldering iron according to claim 11, wherein said electrical connector assembly has a housing which is removably mounted in said elongated hollow body, said O-ring being mounted on an end of said housing and said leaf spring connectors being mounted to the housing for electrical connection engagement with the electrical connectors of the tip heater cartridge and grounding contact with the outer surface of the cartridge body upon plug-in insertion of the tip heater cartridge into the passage of the elongated hollow body of the handpiece.

13. Soldering iron according to claim 6, wherein said at least one annular member and said key member are parts of a molded plastic sleeve mounted on a lower portion of the cartridge body.

14. Soldering iron according to claim 7, wherein radially inwardly extending guide formations are provided along a front portion of the handpiece for aligning and guiding the sleeve during initial insertion of the cartridge into the handpiece, said formations being axially spaced from said sleeve and being radially spaced from said cartridge body in a fully inserted position of the cartridge within said passage.

15. A tip heater cartridge for a soldering iron, comprising:
an elongated cartridge body,
a heater mounted within the cartridge body;
a soldering tip mounted on a first end of the cartridge body;
electrical connectors at an opposite, second end of the cartridge body for plug-in connection with an electrical connector assembly of a soldering iron handpiece in use; and
at least one member mounted on the exterior of the cartridge body for mechanically supporting the cartridge radially and axially relative to the soldering iron handpiece in use at plural locations spaced circumferentially about the cartridge.

16. A tip heater cartridge according to claim 15, wherein said at least one member comprises at least one annular sleeve.

17. A soldering iron having a handpiece and tip heater cartridge,
wherein the handpiece has:
an elongated hollow body with an inner passage that is open at an outer end of the passage and which receives said tip heater cartridge; and
an electrical connector assembly mounted at an inner end of said passage; and
wherein the tip heater cartridge comprises:
an elongated cartridge body;
a heater mounted within the cartridge body;
a soldering tip mounted on a first end of the cartridge body;
electrical connectors at an opposite, second end of the cartridge body for plug-in connection with the electrical connector assembly of the soldering iron handpiece; and
a mechanical supporting piece mounted on the exterior of the cartridge body for axially supporting the cartridge relative to the soldering iron handpiece by abutting engagement thereof with inner surface areas of said passage in a manner preventing transference of axial loads applied to the tip to the electrical connectors and electrical connector assembly.

18. Soldering iron according to claim 17, wherein at least one radially protecting key member is provided as said mechanical supporting piece; and wherein a keyway is provided along a portion of said inner passage extending inward from said outer end, said key being receivable in said keyway; and wherein said keyway has a stop surface which is engageable by an inwardly facing end of the key for limiting insertion of said cartridge into said handpiece without applying mechanical stress to the electrical connectors and the electrical connector assembly.

* * * * *